No. 763,401. PATENTED JUNE 28, 1904.
S. JANULIEWICZ.
MEANS FOR PREPARING LIQUID FOOD.
APPLICATION FILED SEPT. 5, 1903.
NO MODEL. 2 SHEETS—SHEET 1.
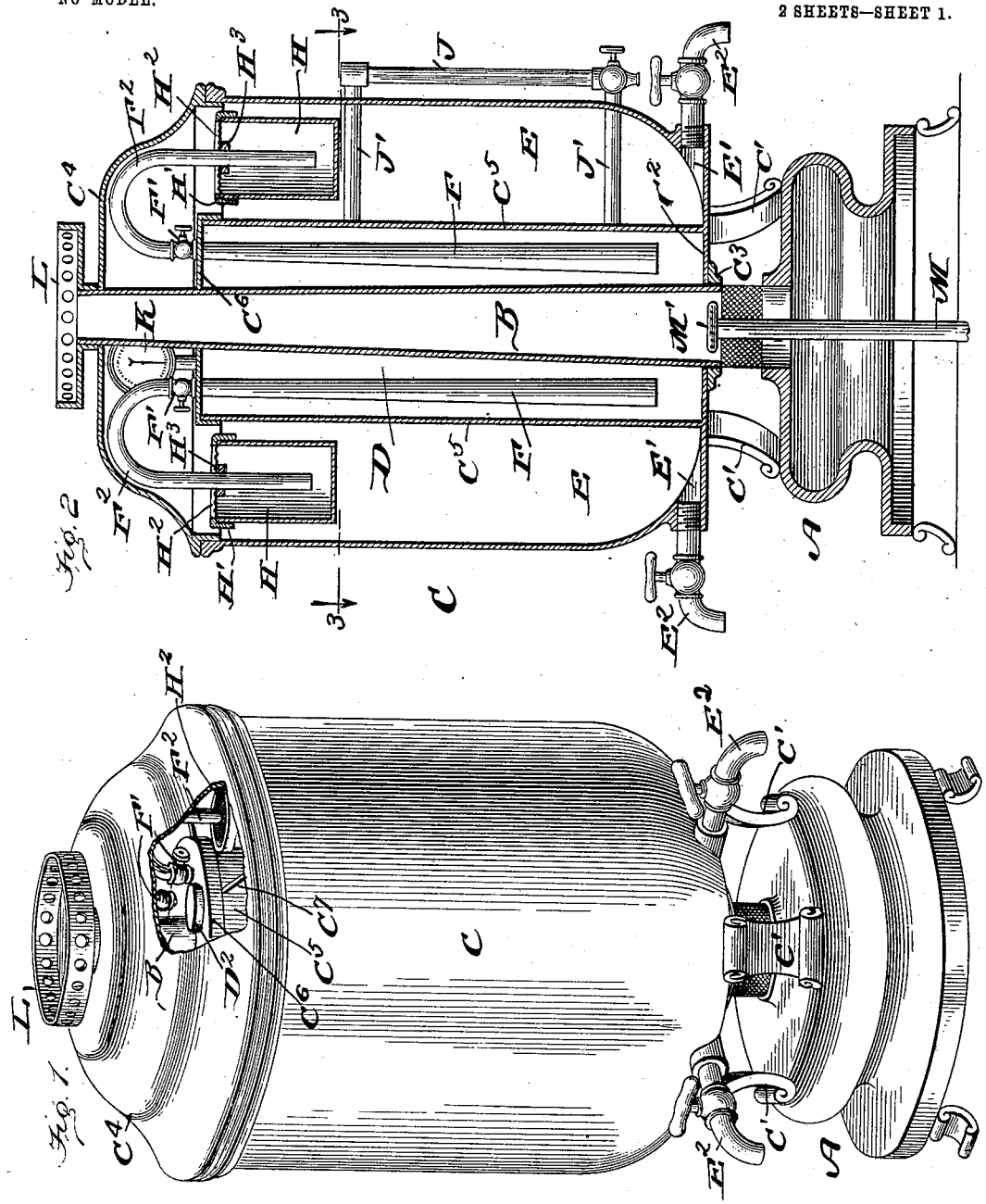
Inventor
S. Januliewicz.

No. 763,401. PATENTED JUNE 28, 1904.
S. JANULIEWICZ.
MEANS FOR PREPARING LIQUID FOOD.
APPLICATION FILED SEPT. 5, 1903.
NO MODEL. 2 SHEETS—SHEET 2.
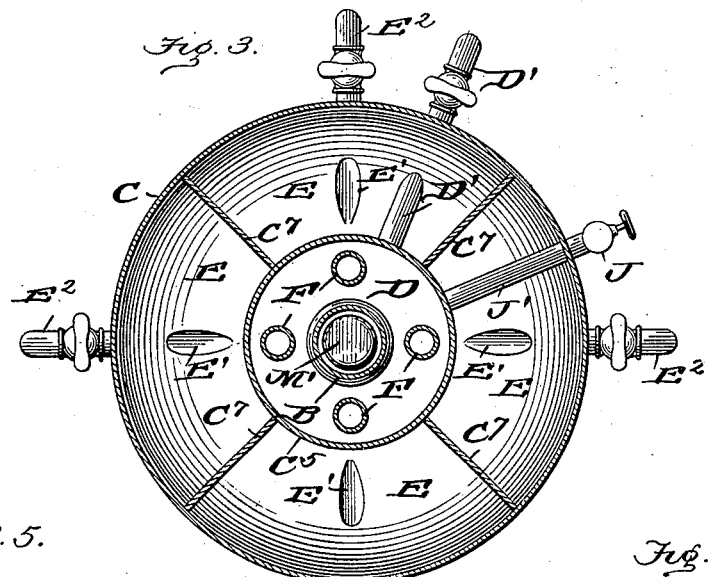
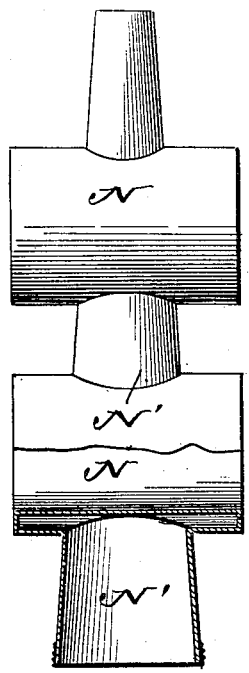
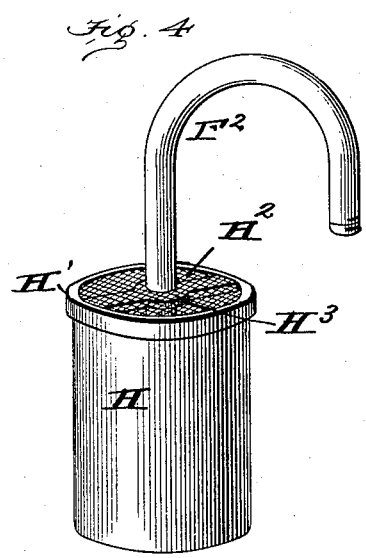
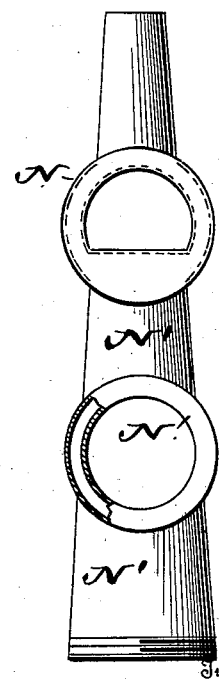
Witnesses
Inventor
S. Januliewicz.

No. 763,401.	Patented June 28, 1904.

UNITED STATES PATENT OFFICE.

STEFAN JANULIEWICZ, OF WILMINGTON, DELAWARE.

MEANS FOR PREPARING LIQUID FOOD.

SPECIFICATION forming part of Letters Patent No. 763,401, dated June 28, 1904.

Application filed September 5, 1903. Serial No. 172,134. (No model.)

*To all whom it may concern:*

Be it known that I, STEFAN JANULIEWICZ, a subject of the Czar of Russia, residing at Wilmington, in the county of Newcastle and State of Delaware, have invented a new and useful Means for Preparing Liquid Food, of which the following is a specification.

My invention is an improvement in means for preparing liquid food; and the object of my invention is to combine with a lamp or other burner means for preparing at the same time a number of beverages or liquid foods, such as tea, coffee, cocoa, beef-tea, &c.

While adapted for home use, this device is especially designed for lunch-rooms, boarding-houses, and all places where a variety of beverages are required at the same time.

My invention consists in the novel features of construction and combination of parts hereinafter described, particularly pointed out in the claims, and shown in the accompanying drawings, in which—

Figure 1 is a perspective view of my device partly broken away. Fig. 2 is a vertical section through same. Fig. 3 is a horizontal section on the line 3 3 of Fig. 2. Fig. 4 is a perspective view of a retaining-receptacle. Fig. 5 is a view showing a slight modification in the construction of the lamp chimney or flue. Fig. 6 is a side elevation of the modified form of flue.

In constructing a device of the kind shown I employ a lamp A as a base. This lamp may be of any material desired and of any form or design suitable for the purpose to which it is to be put and for the fuel to be burned therein. On this lamp rests a metallic chimney or flue B, which is adapted to extend upward through the entire heating device. A cylinder vessel C is supported on and above the lamp by the supporting-legs C'. The flue B is tapering toward its upper portion and where it passes through the base $C^2$ of the vessel C is threaded. The base $C^2$ is centrally cut out and provided with a threaded flange $C^3$, adapted to engage the threaded portion of the flue and make a water-tight joint. The vessel C is closed at the top by a flanged removable cover $C^4$, through which the flue B projects, and is preferably divided into five compartments, though this number may be increased or decreased. The first of these compartments is a central cylindrical chamber D, formed by the cylindrical centrally-arranged divisional wall $C^5$, which encircles the flue B throughout the greater portion of its length. This chamber is closed at its upper end by the cover $C^6$. The portion of the vessel exterior of the chamber D is preferably divided into four compartments E by the vertical divisional walls $C^7$, which radiate from the wall $C^5$.

Secured to and extending through the cover $C^6$ are the depending tubes F, equal in number to the number of the compartments E and stopping at their ends just short of the bottom $C^2$. Above the cover $C^6$ these tubes are provided with suitable valves F', and above the valves a detachable curved tube $F^2$ is carried by each tube F. These curved portions extend upward into the space beneath the cover $C^4$ of the vessel C, and so over the wall $C^5$ and downward into the upper portions of the compartments E, one tube leading to each compartment. Each tube $F^2$ carries adjacent its lower end and opens into a retaining-receptacle H. This receptacle has a detachable cover H', comprising a screen or sieve $H^2$ and the cross-piece $H^3$, to which the tube $F^2$ is secured.

Each compartment E has at the bottom a discharge-outlet E', fitted with a suitable faucet $E^2$, through which the contents of the compartment can be drawn off.

A pipe D' leads from the chamber D to a point exterior of the vessel C, through which hot water may be drawn off. A sight-gage J is connected at its upper and lower ends with the compartment D, which may be termed the "boiler," by the feed-pipes J', and by means of this gage the amount of water in the boiler may be determined. The boiler is filled through an opening closed by the screw-cap $D^2$. A steam-gage K of the usual construction is arranged on the cover $C^6$. On the upper end of the flue and encircling same is a circular bracket L, on which cups, plates, or other articles can be placed to warm or be kept warm. A gas-pipe M, carrying a perforated head M', discharges gas into the lower end of the flue B.

In Figs. 5 and 6 I have shown a slight modification of the flue, which consists in arranging horizontally double cylinders N in a flue N', the flue communicating with the outer of the cylinders, which are closed at the end, and the water in the boiler circulating through the inner cylinders, which are open at the ends. This construction does not in any way affect the operation of my device, but simply gives a greater heating-surface to the flue, and is especially adapted for use in the larger sizes.

The operation of my device is as follows: Assuming that tea, coffee, and cocoa are to be prepared, the boiler D is filled with water, the tea, coffee, and cocoa are placed each in a separate receptacle H, and the valves F', controlling the tubes leading to those receptacles, are opened, the valve in the tube leading to the fourth and unused receptacle remaining closed. Steam forming in the upper part of the boiler will force the water to the receptacles, and the overflow from the latter will fill the compartments E, the screening $H^2$ preventing tea-leaves, coffee-grounds, &c., from passing from the receptacles to the compartments.

It is of course understood that valves and faucets may be placed where desired or needed without departing from my invention or changing the mode of operation and that any suitable kind of lamp, either oil or spirit, may be used. It is further understood that a gas-burner or a small oil or gas stove would be when used with my device an equivalent of the lamp A.

Having thus fully described my invention, what I claim as new, and desire to secure by Letters Patent, is—

1. A device of the kind described comprising a vessel having a central flue extending therethrough, an interior chamber encircling said flue, an outer chamber inclosing the inner chamber and divided into a plurality of compartments, receptacles suspended in said compartments and tubes leading from the inner chamber to said receptacles.

2. The combination with a boiler of means for heating a liquid in said boiler, a plurality of compartments arranged adjacent the boiler, valve-controlled tubes leading from the boiler to the compartments, receptacles arranged in the upper portions of the compartments, the said tubes discharging into said receptacles, and screens covering the tops of the receptacles.

3. The combination with a source of heat, a boiler arranged adjacent thereto, a flue extending through the boiler, a plurality of compartments adapted to contain a liquid, discharge-faucets arranged adjacent the bottoms of the compartments, receptacles open at the top and suspended in the upper portions of said compartments, and a valve-controlled tube leading from the boiler to each receptacle and discharging therein.

4. The combination with a lamp, of a metallic flue arranged on said lamp, a boiler adapted to contain water arranged around said flue, a plurality of compartments grouped around said boiler, receptacles adapted to hold a beverage-flavoring material suspended in the upper portions of said compartments, tubes leading from the boiler and discharging into said receptacles, screens covering the tops of the receptacles, and means for drawing the overflow from said receptacles from the compartments.

5. A device of the kind described comprising a boiler, a plurality of compartments arranged adjacent the boiler, a plurality of tubes arranged in the boiler and projecting from same, detachable tubes secured to said projecting portions and extending into the upper portions of the compartments, upwardly-open receptacles suspended within the compartments by said tubes, the tubes discharging into said receptacles, and means carried by the compartments for drawing off the overflow from said receptacles.

6. A device of the kind described comprising a plurality of compartments, a detachable cover adapted to close all of said compartments, a receptacle open at the top and adapted to contain a beverage-flavoring material arranged in the upper portion of each compartment, a removable screen covering each receptacle and adapted to prevent escape of solid matter therefrom, separate discharge-faucets for drawing off the contents of the compartments and means for simultaneously feeding boiling water to each of said receptacles.

7. The combination with a lamp, of a plurality of concentric chambers arranged above said lamp, a flue passing through the central chamber, divisional walls dividing the outer chamber into a plurality of compartments, open receptacles arranged in the compartments, water-feed tubes leading from adjacent the bottom of the inner chamber into the compartments of the outer chamber and discharging into the receptacles, and discharge-faucets carried by each compartment.

STEFAN JANULIEWICZ.

Witnesses:
FRENK ORZEHOWSKI,
WANDA S. PONIECKA.